US012570120B2

(12) United States Patent
Ono et al.

(10) Patent No.: US 12,570,120 B2
(45) Date of Patent: Mar. 10, 2026

(54) STOWAGE SYSTEM

(71) Applicant: Honda Motor Co., Ltd., Tokyo (JP)

(72) Inventors: Fuyuki Ono, Tokyo (JP); Takahiko Abe, Tokyo (JP); Takuya Furuno, Tokyo (JP)

(73) Assignee: Honda Motor Co., Ltd, Tokyo (JP)

( * ) Notice: Subject to any disclaimer, the term of this patent is extended or adjusted under 35 U.S.C. 154(b) by 391 days.

(21) Appl. No.: 18/221,822

(22) Filed: Jul. 13, 2023

(65) Prior Publication Data

US 2024/0034118 A1    Feb. 1, 2024

(30) Foreign Application Priority Data

Aug. 1, 2022    (JP) ................................. 2022-122825
Aug. 1, 2022    (JP) ................................. 2022-122826

(51) Int. Cl.
*B60H 1/00*        (2006.01)
*B60R 5/04*        (2006.01)

(52) U.S. Cl.
CPC ..... *B60H 1/00271* (2013.01); *B60H 1/00792* (2013.01); *B60H 1/00828* (2013.01); *B60R 5/04* (2013.01)

(58) Field of Classification Search
None
See application file for complete search history.

(56) References Cited

U.S. PATENT DOCUMENTS

2019/0337360 A1 *   11/2019   Keller .................. B60H 3/0658

FOREIGN PATENT DOCUMENTS

JP            2022100049 A        7/2022

* cited by examiner

*Primary Examiner* — Ko-Wei Lin
(74) *Attorney, Agent, or Firm* — Duft & Bornsen, PC

(57) ABSTRACT

A stowage system includes: a lock detection sensor detecting an unlocked state where a package can be taken in and out of a second package room which is separated from both an interior space of a vehicle and a first package room formed above the horizontal plane extending along a floor of the interior space, and allows the package to be taken in and out from an outside of the vehicle, or a locked state; an air conditioning device; and a microprocessor. The air conditioning device forms a flow of air in the second package room by a fan. The microprocessor is configured to perform outputting an operation signal to the air conditioning device so that the fan operates when the lock detection sensor detects locking of the second package room in a state where the second package room stows the package.

19 Claims, 10 Drawing Sheets

100

111L        10        111R        HT

UP

LEFT ◄——►RIGHT

DOWN

STOWAGE SYSTEM

CROSS-REFERENCE TO RELATED APPLICATION

This application is based upon and claims the benefit of priority from Japanese Patent Application No. 2022-122825 filed on Aug. 1, 2022 and Japanese Patent Application No. 2022-122826 filed on Aug. 1, 2022, the content of which are incorporated herein by reference.

BACKGROUND OF THE INVENTION

Field of the Invention

The present invention relates to a stowage system that can use a vehicle as a stowage of a package.

Description of the Related Art

As this type of device, a device that can designate a vehicle interior of a vehicle of a user who is a package recipient as a delivery destination is conventionally known (e.g., see JP 2022-100049 A). However, when the vehicle interior can be designated as a delivery destination of a package as in the device described in JP 2022-100049 A, a third party can access the vehicle interior, which is not preferable for crime prevention.

SUMMARY OF THE INVENTION

An aspect of the present invention is a stowage system including: a lock detection sensor detecting an a lock detection sensor detecting an unlocked state where a package can be taken in and out of a second package room which is provided below a horizontal plane, is separated from both an interior space of a vehicle and a first package room formed above the horizontal plane extending along a floor of the interior space, and allows the package to be taken in and out from an outside of the vehicle, or a locked state where the package cannot be taken in and out of the second package room; an air conditioning device forming a flow of air in the second package room; and a microprocessor and a memory coupled to the microprocessor. The air conditioning device has a fan and forms a flow of air in the second package room by the fan. The microprocessor is configured to perform outputting an operation signal to the air conditioning device so that the fan operates when the lock detection sensor detects locking of the second package room in a state where the second package room stows the package.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
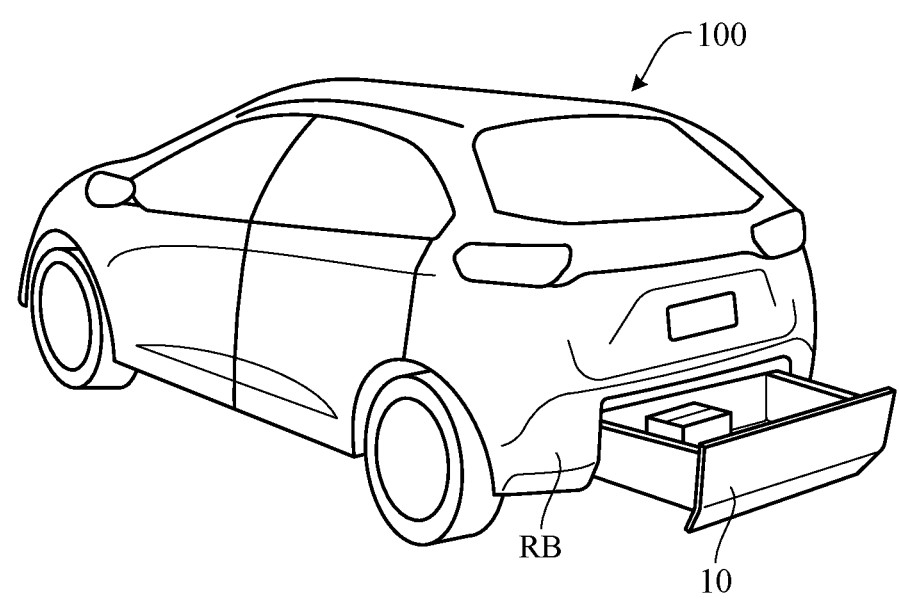
FIG. 1 is a view illustrating an example of a vehicle provided with a stowage apparatus according to an embodiment of the present invention.
Figure 1:
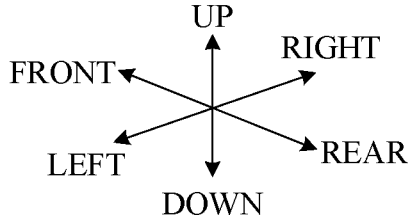

Hereinafter, an embodiment of the present invention will be described with reference to FIGS. 1 to 9. FIG. 1 is a view illustrating an example of a vehicle provided with a stowage apparatus according to the embodiment of the present invention. As illustrated in FIG. 1, a stowage apparatus 10 is a tray-type package compartment provided at the rear of a vehicle 100 and can be pulled out rearward from the vehicle rear end. The stowage apparatus 10 is provided separately from a vehicle interior space of the vehicle 100, and is provided in a rear bumper RB of the vehicle 100 in the example illustrated in FIG. 1.

Figure 2:
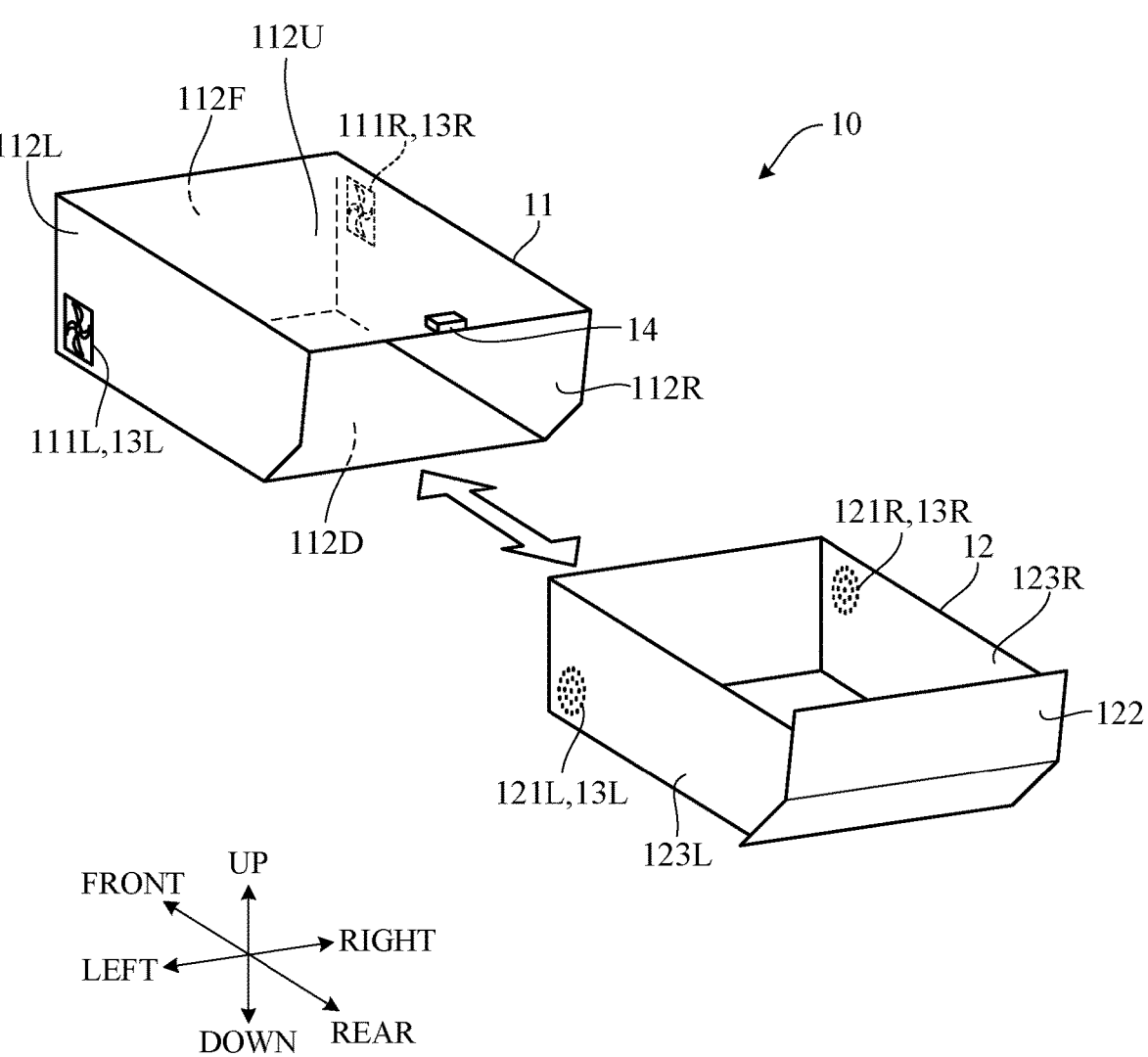
FIG. 2 is a view illustrating an appearance shape of the stowage apparatus in FIG. 1.

FIG. 2 is a view illustrating an appearance shape of the stowage apparatus 10 in FIG. 1. As illustrated in FIG. 2, the stowage apparatus 10 includes a case support portion 11 and a case portion 12. The case support portion 11 supports the case portion 12, forming a package room, in a movable manner in the front-rear direction (direction indicated by a white double arrow) between a storage position where the case portion 12 is stored in the vehicle 100 and a pull-out position where the case portion 12 is pulled out from the vehicle 100. The case support portion 11 has an outer case portion formed in a case shape so as to surround the case portion 12 when the case portion 12 is positioned in the storage position. The outer case portion, more specifically, side walls 112R, 112L, and 112F, an upper wall 112U, and a lower wall 112D of the outer case portion are formed of a heat insulating material.

The stowage apparatus 10 includes an air conditioning portion 13 (13L and 13R) forming an air flow in the case portion 12. The air conditioning portion 13L has an air inlet 111L and an air hole 121L. The air conditioning portion 13R has an air outlet 111R and an air hole 121R. As illustrated in FIG. 2, the air inlet 111L is provided below the air outlet 111R. The case portion 12 has side walls 123L and 123R extending in the pull-out direction and opposing each other, and an end wall 122 forming a part of the vehicle body surface when the case portion 12 is positioned in the storage position. The side wall 123L is provided with the air hole 121L so as to oppose the air inlet 111L provided in the case support portion 11. The side wall 123R is provided with the air hole 121R so as to oppose the air outlet 111R provided in the case support portion 11.

The air inlet 111L is provided on the side wall 112L of the case support portion 11 so as to oppose the side wall 123L (the air hole 121L) when the case portion 12 is positioned in the storage position, and guides outside air into the package room of the case portion 12 in a substantially horizontal direction through the air hole 121L. The air inlet 111L has a fan (blower), and when the fan operates, outside air is forcibly guided into the package room of the case portion 12. The air outlet 111R is provided on the side wall 112R of the case support portion 11 so as to oppose the side wall 123R (the air hole 121R) when the case portion 12 is positioned in the storage position, and discharges the air in the package room of the case portion 12 to the outside in a substantially horizontal direction through the air outlet 111R. The air outlet 111R has a fan, and when the fan operates, the air in the package room of the case portion 12 is forcibly discharged to the outside.

The air hole 121L is provided on the side wall 123L so as to oppose the air inlet 111L provided in the case support portion 11 when the case portion 12 is positioned in the storage position. The air hole 121R is provided on the side wall 123R so as to oppose the air outlet 111R provided in the case support portion 11 when the case portion 12 is positioned in the storage position.

The stowage apparatus 10 further includes an opening-closing lock portion 14 that permits or prohibits movement of the case portion 12 from the storage position to the pull-out position. The opening-closing lock portion 14 is provided in a predetermined location in the case support portion 11. In the example illustrated in FIG. 2, the opening-closing lock portion 14 is provided in the center in the left-right direction of the rear end of the upper wall 112U of the case support portion 11. Note that the opening-closing lock portion 14 may be installed at other positions, not limited to the position illustrated in FIG. 2. The opening-closing lock portion 14 may be a latch mechanism that fixes the case portion 12 to the case support portion 11, or may be a lock mechanism that prohibits movement of a slide rail described later.

The opening-closing lock portion 14 is an electronic lock (what is called a smart lock) that can be unlocked by communicating (near field communication) with a user terminal 30 authenticated in advance. The opening-closing lock portion 14 has an automatic lock mechanism that automatically locks (bring into an actuated state) when the case portion 12 is returned from the pull-out position to the storage position. Note that the opening-closing lock portion 14 may be manually locked and unlocked. For example, the opening-closing lock portion 14 may be lockable and unlockable by a cylinder lock (not illustrated) provided near the left-right center of the upper end of the end wall 122 of the case portion 12.

Figure 3A:
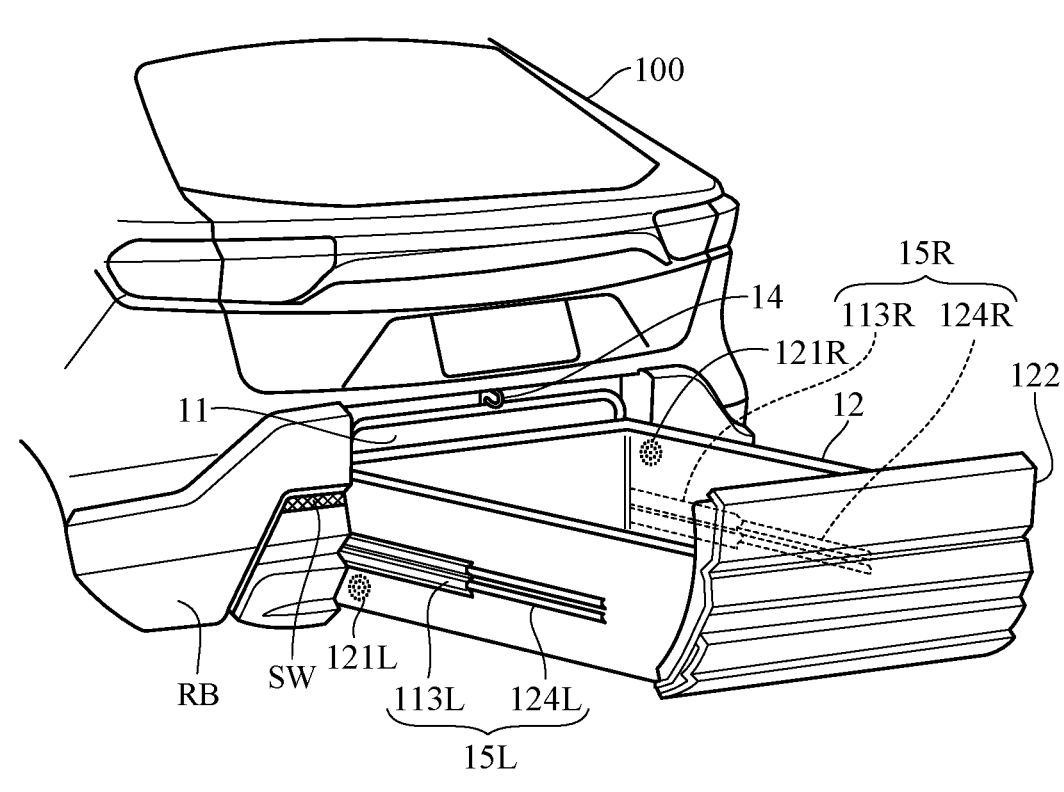
FIG. 3A is a view illustrating a state where the stowage apparatus of FIG. 1 is mounted on a vehicle.
Figure 3A:
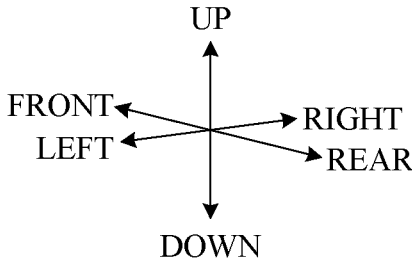
Figure 3B:
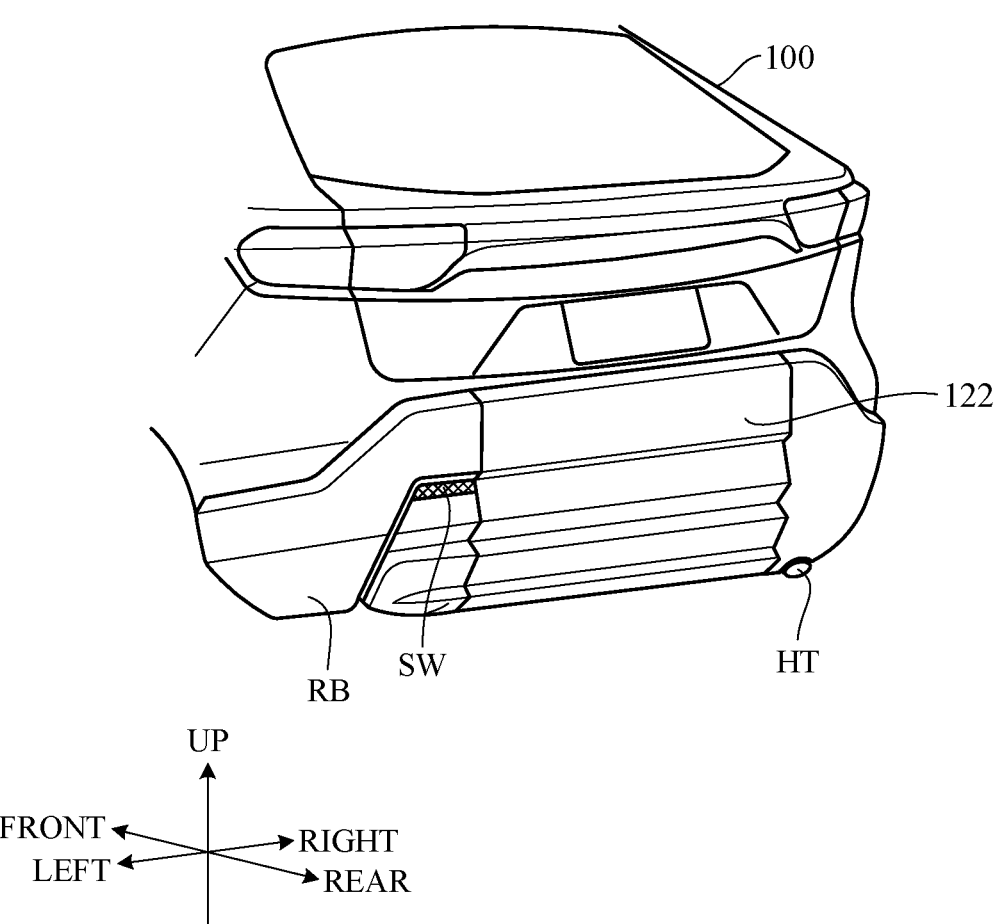
FIG. 3B is a view illustrating a state where the stowage apparatus of FIG. 1 is mounted on the vehicle.

FIGS. 3A and 3B are views illustrating a state where the stowage apparatus 10 of FIG. 1 is mounted on the vehicle 100. FIG. 3A illustrates a state where the case portion 12 is positioned in the pull-out position, and FIG. 3B illustrates a state where the case portion 12 is positioned in the storage position. The case support portion 11 of the stowage apparatus 10 is provided substantially horizontally in the rear of the vehicle 100. The case support portion 11 may be provided integrally with a vehicle body frame so as to form a part of the vehicle body frame, or may be provided attachably to the vehicle body frame. The stowage apparatus 10 includes a slide rail 15 (15L and 15R), and the case support portion 11 supports the case portion 12 to be able to be pulled out in a substantially horizontal direction via the slide rail 15. The slide rail 15 includes an outer rail 113 (113L and 113R) fixed to the case support portion 11 and an inner rail 124 (124L and 124R) fixed to the case portion 12.

The vehicle body surface of the vehicle 100 is provided with a switch SW that inputs a pull-out command of the case portion 12. As illustrated in FIG. 3B, the switch SW is provided on a side of the end wall 122. This makes it possible to pull out the case portion 12 from the outside of the vehicle 100, and easily take the package in and out of the stowage apparatus 10. The slide rail 15 includes a linear guide actuator (not illustrated), and when the switch SW is pressed in a state where the case portion 12 is positioned in the storage position, the opening-closing lock portion 14 is brought into a non-actuated state, and the case portion 12 is pulled out rearward by a predetermined length by the linear guide actuator. Due to this, a gap is formed between the end wall 122 and the vehicle body, and therefore the user can easily pull out the case portion 12 by putting his/her hand on the upper end of the end wall 122. When the end wall 122 is pushed forward in a state where the case portion 12 is positioned in the pull-out position, the case portion 12 is slowly (at a predetermined moving speed) pulled into the storage position by the linear guide actuator. When the case portion 12 reaches the storage position, the opening-closing lock portion 14 is brought into an actuated state by the automatic lock mechanism, and the movement of the case portion 12 from the storage position to the pull-out position is prohibited. The end wall 122 is formed to have the same shape as the shape of the vehicle body surface continuous with the end wall 122 when the case portion 12 is positioned in the storage position. In the example illustrated in FIG. 3B, the end wall 122 is formed to have a shape similar to the surface shape (irregular shape for high rigidity) of the rear bumper RB of the vehicle 100. This makes it possible to provide the stowage apparatus 10 to the vehicle 100 without lowering the rigidity of the rear bumper and without impairing the appearance of the vehicle 100.

Note that the structure of the slide rail 15 may be a ball retainer type, a roller type, or other types. The type of the slide rail 15 is not limited to a single slide, and may be a three-member slide having an intermediate rail (not illustrated) in addition to the outer rail 113L and the inner rail 124L.

Figure 4A:
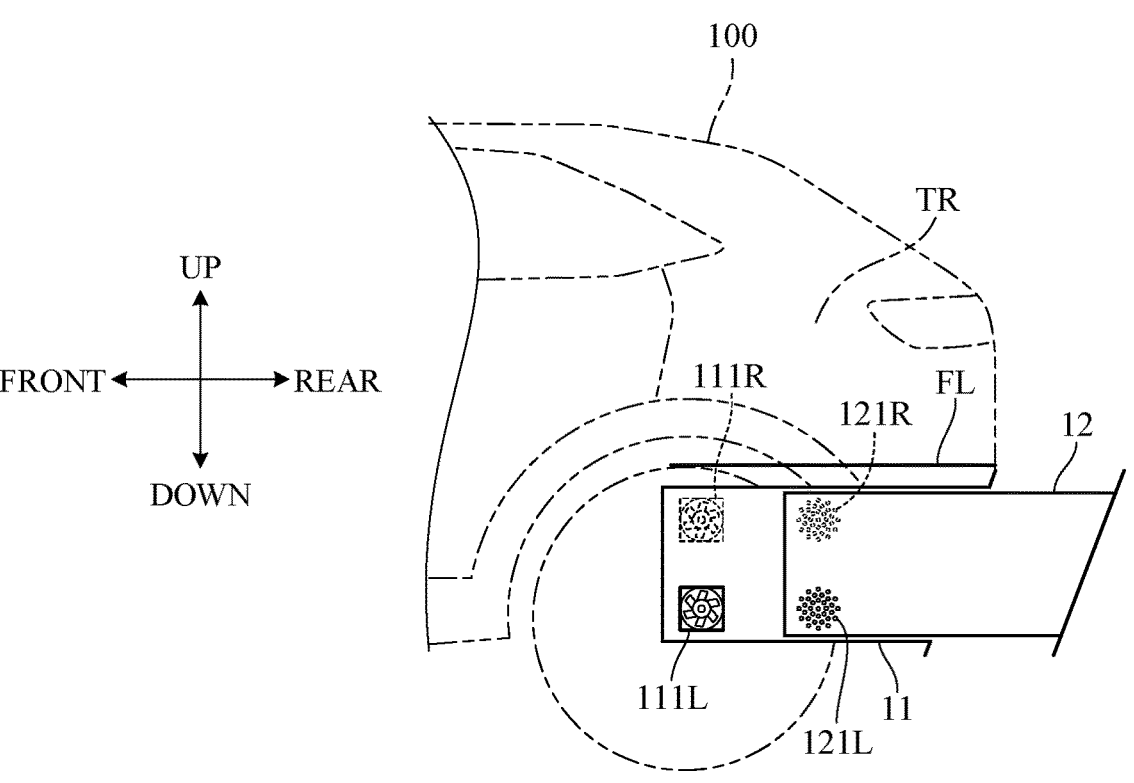
FIG. 4A is a right side view of the vehicle on which the stowage apparatus is mounted.
Figure 4B:
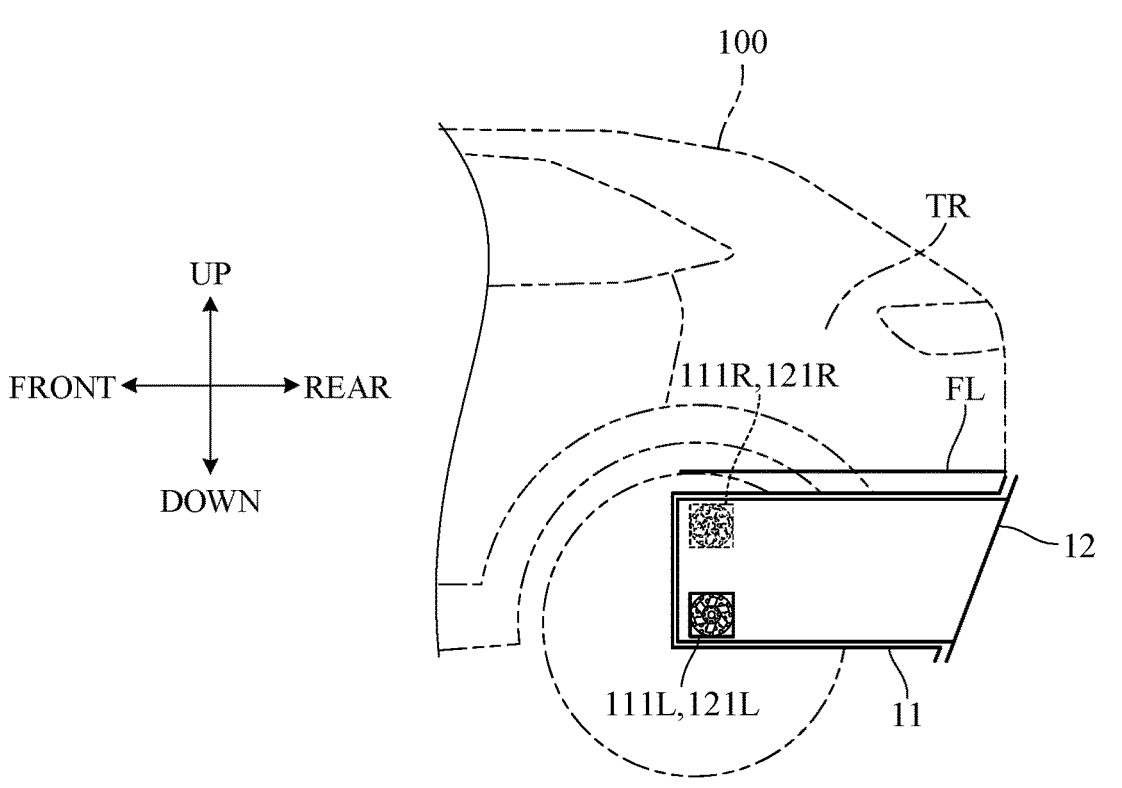
FIG. 4B is a right side view of the vehicle on which the stowage apparatus is mounted.

FIGS. 4A and 4B are right side views of the vehicle 100 on which the stowage apparatus 10 is mounted. FIG. 4A illustrates a state where the case portion 12 is positioned in the pull-out position, and FIG. 4B illustrates a state where the case portion 12 is positioned in the storage position. As illustrated in FIGS. 4A and 4B, the case support portion 11 is provided below a horizontal plane extending along a floor FL of the vehicle interior space of the vehicle 100 separately from the vehicle interior space. The case support portion 11 supports the case portion 12 to be able to be pulled out in the substantially horizontal direction. A space TR in FIGS. 4A and 4B is a trunk room of the vehicle 100 formed above the horizontal plane extending along the floor FL.

Figure 5:
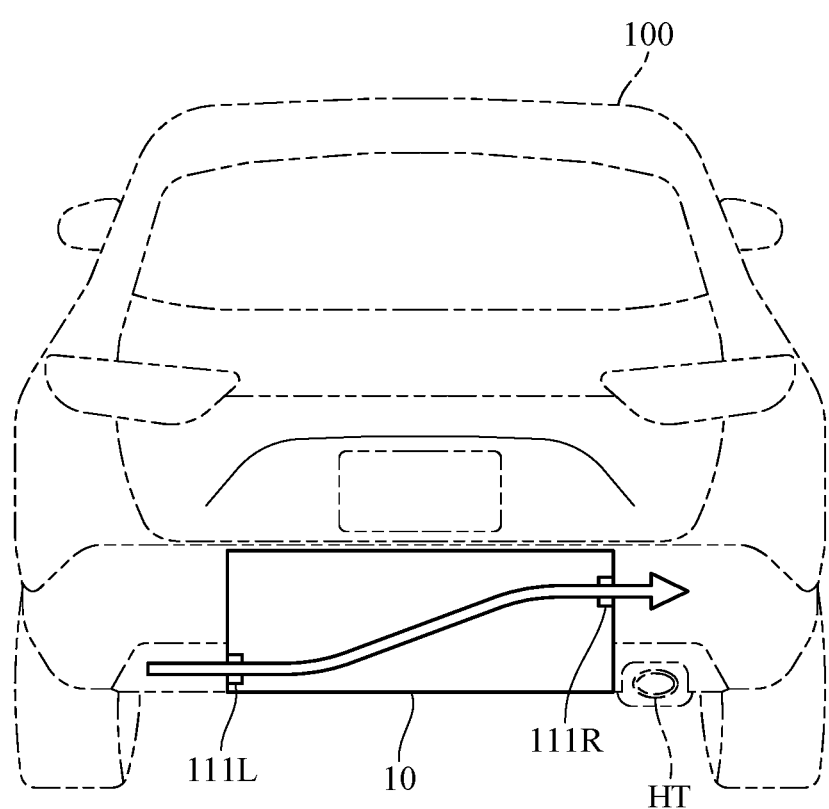
FIG. 5 is a view for describing a flow of air in the case portion of the stowage apparatus of FIG. 1.
Figure 5:
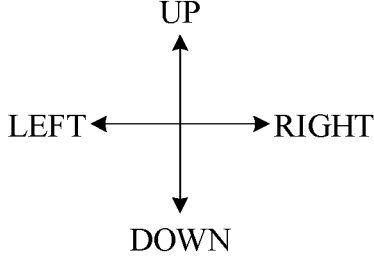

FIG. 5 is a view for describing a flow of air in the case portion 12 formed by the air conditioning portion 13. FIG. 5 illustrates a rear view of the vehicle 100 on which the stowage apparatus 10 is mounted. In FIG. 5, the end wall 122 of the case portion 12 is omitted for simplification of the figure. Arrows in the figure schematically represent the flow of air flowing into the case portion 12 and flowing out from the case portion 12. The air flowing in from the air inlet 111L rises when heated in the case portion 12, and flows out from the air outlet 111R. This makes it possible to prevent the temperature in the case portion 12 from excessively rising even when the fans at the air inlet 111L and the air outlet 111R are not in operation. By operating the fans of the air inlet 111L and the air outlet 111R, it is possible to forcibly generate convection of air as indicated by the white arrow in the figure and to adjust the temperature in the case portion 12.

When a heating portion HT whose temperature rises to equal to or greater than a predetermined threshold when use of the vehicle 100 (engine start, running, or the like) is started, such as a muffler, is disposed in the rear of the vehicle 100 provided with the stowage apparatus 10, if the air inlet 111L is provided in the vicinity of the heating portion HT, the air warmed by the heating portion HT may flow into the case portion 12 from the air inlet 111L. In such a case, the temperature in the case portion 12 may excessively rise, and the use of the stowage apparatus 10 may be hindered. Therefore, to avoid such a situation, the air inlet 111L is provided farther from the heating portion HT than the air outlet 111R as illustrated in FIG. 5. Note that a temperature higher than at least the outside air temperature is set as the predetermined threshold.

Figure 6:
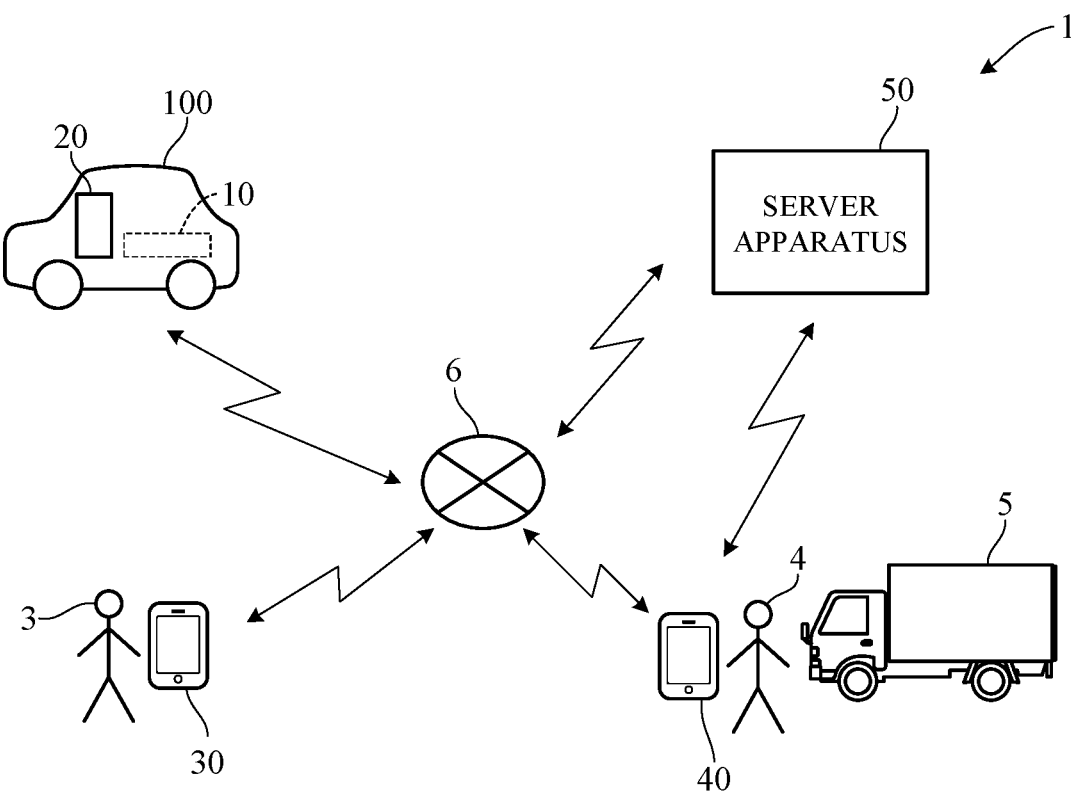
FIG. 6 is a view schematically illustrating an overall configuration of a stowage system that is an application example of the stowage apparatus according to the embodiment of the present invention.

FIG. 6 is a view schematically illustrating an overall configuration of a stowage system that is an application example of the stowage apparatus 10 according to the embodiment of the present invention. FIG. 6 illustrates a stowage system (hereinafter, also referred to as delivery system) 1 that can designate the stowage apparatus 10 provided in the vehicle 100 as a delivery place of a package.

As illustrated in FIG. 6, the delivery system 1 includes the vehicle 100 provided with the stowage apparatus 10 and possessed by a user 3, who uses the delivery system 1, an in-vehicle terminal 20 of the vehicle 100, the user terminal 30 possessed by the user 3, a deliverer terminal 40 possessed by a deliverer 4 at a business office (hereinafter, referred to as delivery office) where the delivery business is performed, and a server apparatus 50.

The in-vehicle terminal 20, the user terminal 30, the deliverer terminal 40, and the server apparatus 50 are connected to a network 6 including a public wireless communication network represented by the Internet network, a mobile phone network, and the like, and can communicate with one another via the network 6. Note that the network 6 also includes a closed communication network provided for each predetermined managed area, for example, a wireless LAN, Wi-Fi (registered trademark), and Bluetooth (registered trademark).

Figure 7:
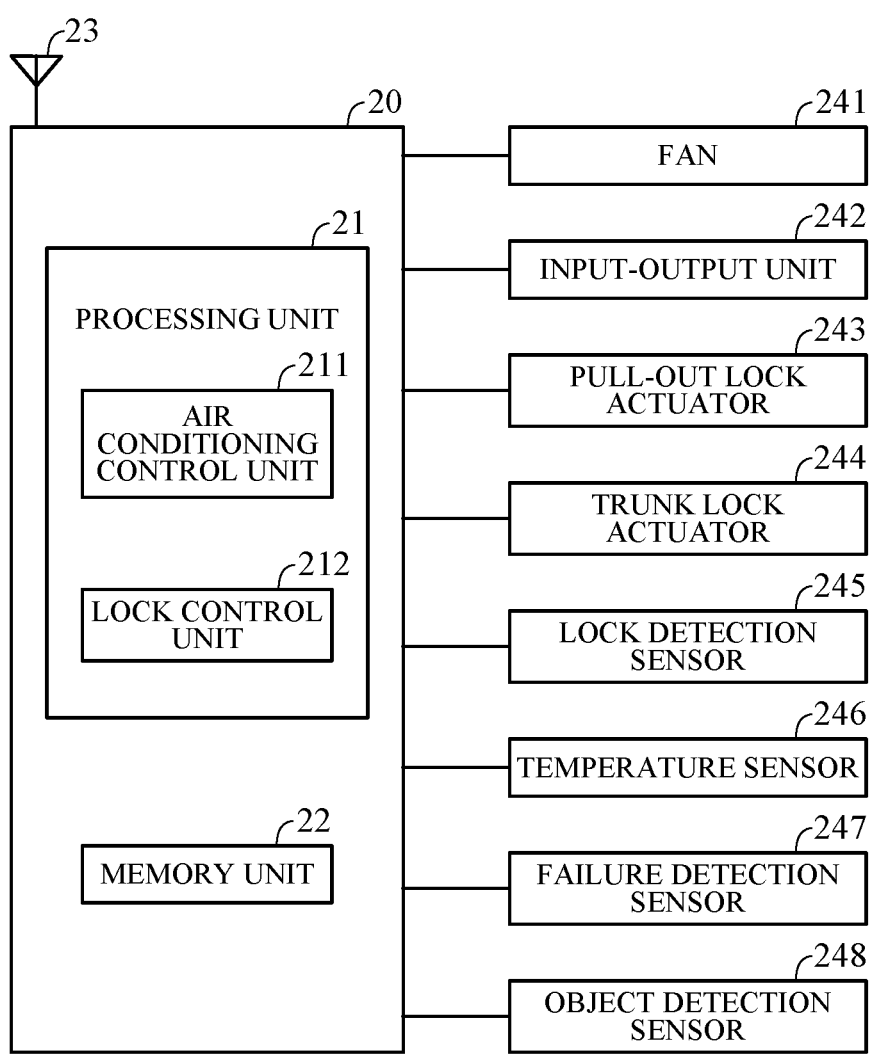
FIG. 7 is a view illustrating a schematic configuration of the in-vehicle terminal of FIG. 6.

FIG. 7 is a view illustrating a schematic configuration of the in-vehicle terminal 20 of FIG. 6. As illustrated in FIG. 7, the in-vehicle terminal 20 includes a computer having an arithmetic unit 21 such as a CPU, a storage unit 22 such as a ROM and a RAM, and other peripheral circuits (not illustrated) such as an I/O interface. The in-vehicle terminal 20 includes a communication unit 23, a fan 241, an input-output unit 242, a pull-out lock actuator 243, a trunk lock actuator 244, a lock detection sensor 245, a temperature sensor 246, a failure detection sensor 247, and an object detection sensor 248.

The communication unit 23 is configured to be able to wirelessly communicate with the user terminal 30, the deliverer terminal 40, and the server apparatus 50 via the network 6. The fan 241 is a fan included in the air inlet 111L and the air outlet 111R, and constitutes a part of the air conditioning portion 13. The fan 241 of the air inlet 111L forcibly guides the air into the package room of the case portion 12. The fan 241 of the air outlet 111R forcibly discharges the air in the package room of the case portion 12. The fan 241 may be an axial fan, a centrifugal fan, or other types of fan.

The input-output unit 242 inputs various commands. The input-output unit 242 includes the switch SW (FIGS. 3A and 3B) as an input device that inputs a pull-out command of the case portion 12. The input-output unit 242 includes an output device such as a speaker and a display, and outputs various types of information. The pull-out lock actuator 243 constitutes a part of the opening-closing lock portion 14, and locks or unlocks the stowage apparatus 10. More specifically, the pull-out lock actuator 243 permits or prohibits opening and closing of the case portion 12 (movement between the pull-out position and the storage position). The trunk lock actuator 244 unlocks or locks a trunk room formed above the horizontal plane extending along the floor of the vehicle interior space of the vehicle 100. More specifically, when the trunk room of the vehicle 100 is a sealed type trunk room provided separately from the vehicle interior space, the trunk lock actuator 244 permits or prohibits opening and closing of the trunk lid of the trunk room. When the trunk room of the vehicle 100 is an open type trunk room provided on an extension of the vehicle interior space as the trunk room TR in FIGS. 4A and 4B, the trunk lock actuator 244 permits or prohibits opening and closing of the rear gate of the trunk room.

The lock detection sensor 245 detects a locked state or an unlocked state of the stowage apparatus 10. The temperature sensor 246 is provided at a predetermined location of the stowage apparatus 10 and detects the internal temperature of the case portion 12. The failure detection sensor 247 detects a failure of the air conditioning portion 13. For example, the failure detection sensor 247 detects the failure of the air conditioning portion 13 based on the presence or absence of a signal indicating the failure to be output from the fan 241. The object detection sensor 248 detects the presence or absence of an object in the case portion 12 of the stowage apparatus 10. The object detection sensor 248 may be a weight sensor, a photoelectric sensor, or other sensors.

The arithmetic unit 21 includes an air conditioning control unit 211 that controls the fan 241 and a lock control unit 212 as a functional configuration.

The air conditioning control unit 211 operates the fan 241 when the object detection sensor 248 detects an object in the stowage apparatus 10. The air conditioning control unit 211 may operate the fan 241 when the lock detection sensor 245 detects locking of the stowage apparatus 10 in a state where the object detection sensor 248 detects an object in the stowage apparatus 10. Thereafter, the air conditioning control unit 211 controls operation and stop of the fan 241 based on the detection value of the temperature sensor 246. Specifically, the air conditioning control unit 211 outputs an operation signal to the air conditioning portion 13 when the detection value of the temperature sensor 246 is equal to or greater than a predetermined temperature. The fan 241 of the air conditioning portion 13 operates in response to this operation signal. On the other hand, when the detection value of the temperature sensor 246 is less than the predetermined temperature, the air conditioning control unit 211 outputs a stop signal to the air conditioning portion 13. When the object detection sensor 248 does not detect any object in the stowage apparatus 10, the air conditioning control unit 211 outputs a stop signal to the air conditioning portion 13. The fan 241 of the air conditioning portion 13 stops operation in response to this stop signal.

When operating the fan 241, the air conditioning control unit 211 notifies the user 3 that the fan 241 has operated together with the internal temperature of the case portion 12. Specifically, information (display information or the like) indicating that the fan 241 has operated is transmitted to the user terminal 30 together with the detection value of the temperature sensor 246. While the fan 241 is in operation, the air conditioning control unit 211 notifies the user 3 that the fan 241 is operating normally together with the internal temperature of the case portion 12. Specifically, information (display information or the like) indicating that the fan 241 is normally operating is transmitted to the user terminal 30 together with the detection value of the temperature sensor 246. When stopping the fan 241, the air conditioning control unit 211 notifies the user 3 that the fan 241 has stopped together with the internal temperature of the case portion 12. Specifically, information (display information or the like) indicating that the fan 241 has stopped is transmitted to the user terminal 30 together with the detection value of the temperature sensor 246.

When the detection value of the temperature sensor 246 is equal to or greater than a predetermined temperature even after a predetermined time elapses after the fan 241 is operated, the air conditioning control unit 211 notifies the user terminal 30 of a temperature abnormality of the stowage apparatus 10 via the communication unit 23. More specifically, the air conditioning control unit 211 transmits, to the user terminal 30, information (hereinafter, referred to as temperature abnormality information) for notifying the temperature abnormality of the stowage apparatus 10. The temperature abnormality information may be display information or voice information. This makes it possible to display a video for notifying a temperature abnormality onto a display (not illustrated) of the user terminal 30, or output a voice for notifying the temperature abnormality from a speaker (not illustrated) of the user terminal 30. As a result, the user 3 can recognize the temperature abnormality of the stowage apparatus 10. Note that the air conditioning control unit 211 may transmit the temperature abnormality information of the stowage apparatus 10 to the deliverer terminal 40 so that the deliverer 4 can recognize the temperature abnormality of the stowage apparatus 10. The air conditioning control unit 211 may output the temperature abnormality information of the stowage apparatus 10 to the output device included in the input-output unit 242 so that an occupant of the vehicle 100 can recognize the temperature abnormality of the stowage apparatus 10.

When the failure detection sensor 247 detects a failure of the fan 241, the air conditioning control unit 211 notifies the user terminal 30 of the failure of the fan 241 via the communication unit 23. More specifically, the air conditioning control unit 211 transmits, to the user terminal 30, information (hereinafter, referred to as air conditioning failure information) for notifying of the failure of the fan 241. The air conditioning control unit 211 may output the air conditioning failure information, similarly to the temperature abnormality information, to the deliverer terminal 40 or the input-output unit 242 (output device).

The lock control unit 212 receives, via the communication unit 23, an unlocking command of the stowage apparatus 10 transmitted in response to an input operation of the user 3 from a terminal (the user terminal 30) associated with the user 3. Upon receiving the unlocking command of the stowage apparatus 10, the lock control unit 212 transmits an unlocking signal to the pull-out lock actuator 243 to bring the stowage apparatus 10 into an unlocked state where the package can be taken in and out of the case portion 12. On the other hand, upon receiving a locking command of the stowage apparatus 10 from the user terminal 30 via the communication unit 23 when the case portion 12 is positioned in the storage position, the lock control unit 212 transmits a locking signal to the pull-out lock actuator 243 to bring the case portion 12 into a locked state where the package cannot be taken in and out of the case portion 12. When the stowage apparatus 10 is in the unlocked state, the lock control unit 212 brings the opening-closing lock portion 14 into the non-actuated state in response to the operation of the switch SW, and on the other hand, when the stowage apparatus 10 is in the locked state, the lock control unit 212 brings the opening-closing lock portion 14 into the actuated state regardless of the operation of the switch SW. Upon determining that the vehicle 100 is in traveling based on a detection value of a vehicle speed sensor (not illustrated), the lock control unit 212 brings the opening-closing lock portion 14 into the actuated state regardless of the operation of the switch SW even when the stowage apparatus 10 is in the unlocked state. That is, when the vehicle 100 is stopped and the stowage apparatus 10 is in the unlocked state, the lock control unit 212 brings the opening-closing lock portion 14 into the non-actuated state in response to the operation of the switch SW. This makes it possible to prevent the case portion 12 from being unintentionally pulled out during traveling of the vehicle. Note that the unlocking command and the locking command of the stowage apparatus 10 may be input to the lock control unit 212 by an occupant operating a switch (not illustrated) provided in the vehicle interior of the vehicle 100. The unlocking command and the locking command of the stowage apparatus 10 may be transmitted from the deliverer terminal 40 in response to an input operation of the deliverer 4 on the deliverer terminal 40.

When the stowage apparatus 10 is brought into the unlocked state or the locked state, the lock control unit 212 notifies the user terminal 30 of the unlocking or locking of the stowage apparatus 10 via the communication unit 23. More specifically, the lock control unit 212 transmits information (display information or the like) for notifying of the unlocking or locking of the stowage apparatus 10 to the user terminal 30 via the communication unit 23.

The lock control unit 212 receives, via the communication unit 23, an unlocking command of the trunk room of the vehicle 100 transmitted in response to the input operation of the user 3 from the user terminal 30. Upon receiving the unlocking command of the trunk room, the lock control unit 212 transmits an unlocking signal to the trunk lock actuator 244 to bring the trunk room of the vehicle 100 into the unlocked state where the package can be taken in and out. On the other hand, upon receiving the locking command of the trunk room from the user terminal 30 via the communication unit 23, the lock control unit 212 transmits a locking signal to the trunk lock actuator 244 to bring the trunk room of the vehicle 100 into the locked state where the package cannot be taken in and out. When the trunk room of the vehicle 100 is brought into the unlocked state or the locked state, the lock control unit 212 notifies the user terminal 30 of the unlocking or locking of the trunk room via the communication unit 23. More specifically, the lock control unit 212 transmits, via the communication unit 23, information (display information or the like) for notifying of the unlocking or locking of the trunk room to the user terminal 30.

When the locked state of the stowage apparatus 10 is not detected by the lock detection sensor 245 for a certain period of time or more after the package is stowed in the case portion 12, the lock control unit 212 notifies the user terminal 30 of forgetting to lock via the communication unit 23. More specifically, the lock control unit 212 transmits, to the user terminal 30 via the communication unit 23, information (hereinafter, referred to as lock forgetting information) for notifying of forgetting to lock the stowage apparatus 10. The lock forgetting information may be display information or voice information. This makes it possible to display a video for notifying that locking has been forgotten onto the display (not illustrated) of the user terminal 30, or output a voice for notifying that locking has been forgotten from the speaker (not illustrated) of the user terminal 30. As a result, the user 3 can recognize forgetting to lock the stowage apparatus 10. Note that the lock control unit 212 may output the lock forgetting information to the input-output unit 242 (output device) so that the occupant of the vehicle 100 can recognize forgetting to lock the stowage apparatus 10.

In the delivery system 1 illustrated in FIG. 6, the user terminal 30 includes, for example, a mobile terminal such as a smartphone, a tablet terminal, a mobile phone, and various wearable terminals carried and used by the user 3. As a functional configuration, the user terminal 30 includes an input unit such as a touchscreen to which the user 3 inputs various commands, an output unit such as a display that outputs information, and a communication unit that communicates with the server apparatus 50 and the like via the network 6.

The user 3 who uses the delivery system 1 inputs, via the user terminal 30 (input unit) in advance, user information such as an address, a telephone number, and a mail address of the user 3 and information (hereinafter, referred to as vehicle information) of the vehicle 100 on which the stowage apparatus 10 is mounted. The user information also includes identification information (e.g., IP address) of the user terminal possessed by the user 3, and a request command for placing and delivering the package addressed to the user at a designated place (the stowage apparatus 10 of the vehicle 100), that is, a package drop service request command. The vehicle information includes an identification ID (e.g., vehicle registration number) of the vehicle 100, identification information (e.g., IP address) of the in-vehicle terminal 20 of the vehicle 100, and information (hereinafter, referred to as stowage apparatus information) that can specify a shape and a size (capacity) of the stowage apparatus 10 provided in the vehicle 100. The vehicle information includes information (hereinafter, referred to as trunk room information) that can specify a shape and a size (capacity) of the trunk room formed at a predetermined location (e.g., rear) of the vehicle body of the vehicle 100.

The user information and the vehicle information input by the user 3 are transmitted together with the identification ID (user ID) of the user 3 to the server apparatus 50 via the communication unit. This makes it possible to store the user information and the vehicle information associated with the user 3 in a storage unit 52 of the server apparatus 50, and register the user 3 to the delivery system 1. The user 3 registered in the delivery system 1 can lock or unlock the stowage apparatus 10 via the user terminal 30 by installing, on the user terminal 30, application software for locking or unlocking the stowage apparatus 10.

The deliverer terminal 40 includes, for example, a mobile terminal such as a smartphone, a tablet terminal, a mobile phone, and various wearable terminals carried and used by the deliverer 4, who drives a delivery vehicle 5. As a functional configuration, the deliverer terminal 40 includes an input unit such as a touchscreen to which the deliverer 4 inputs various commands, an output unit such as a display that outputs information, and a communication unit that communicates with the server apparatus 50 and the like via the network 6.

The deliverer terminal 40 has pre-installed application software for causing the deliverer terminal 40 to function as an electronic key for unlocking the opening-closing lock portion 14 of the stowage apparatus 10. This function as an electronic key is enabled upon receiving an unlocking signal output from the server apparatus 50 (more specifically, an output unit 514 described later). The unlocking signal received by the deliverer terminal 40 includes a one-time password with which the function as an electronic key compatible with the opening-closing lock portion 14 of the stowage apparatus 10 is enabled only once. This makes it possible to temporarily set the deliverer terminal 40 as an electronic key compatible with the opening-closing lock portion 14.

The server apparatus 50 is configured as, for example, a single server or a distributed server including separate servers for each function. The server apparatus 50 can also be configured as a distributed virtual server created in a cloud environment called a cloud server.

Figure 8:
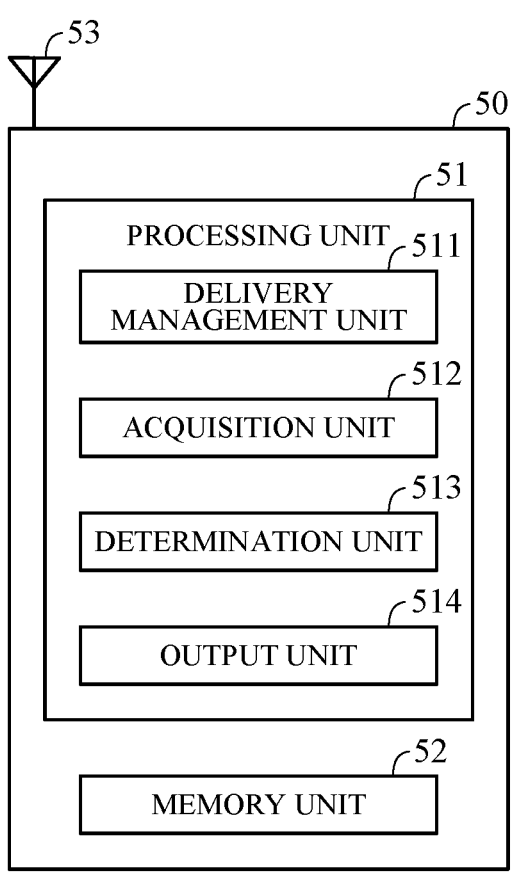
FIG. 8 is a view illustrating a schematic configuration of the server apparatus of FIG. 6.

FIG. 8 is a view illustrating a schematic configuration of the server apparatus 50 of FIG. 6. As illustrated in FIG. 8, the server apparatus 50 includes a computer having an arithmetic unit 51 such as a CPU, a storage unit 52 such as a ROM and a RAM, and other peripheral circuits (not illustrated) such as an I/O interface. The server apparatus 50 includes a communication unit 53 configured to be able to wirelessly communicate with the in-vehicle terminal 20, the user terminal 30, and the deliverer terminal 40 via the network 6. The storage unit 52 stores, together with the user ID, the user information and the vehicle information received together with the user ID from the user terminal 30 via the communication unit 53. The storage unit 52 stores information on the deliverer 4 (hereinafter, referred to as deliverer information) together with the identification ID of the deliverer 4. The deliverer information includes information indicating a delivery area that the deliverer 4 is in charge of and identification information (e.g., telephone number or IP address) of the deliverer terminal 40 possessed by the deliverer 4. The deliverer information is registered in advance in the server apparatus 50 by the delivery office. More specifically, an employee or the like of the delivery office transmits the deliverer information to the server apparatus 50 via a communication terminal (not illustrated) of the delivery office, whereby the deliverer information is stored in the storage unit 52.

The arithmetic unit 51 includes a delivery management unit 511, an acquisition unit 512, a determination unit 513, and the output unit 514 as a functional configuration.

Upon receiving information regarding a delivery request (hereinafter, referred to as delivery information) of a package via the communication unit 53, the delivery management unit 511 manages the delivery information. The delivery information is stored in the storage unit 52. The delivery information includes package information such as the type, shape, and size of the package, information on whether or not the delivery destination is registered in the delivery system 1, and information on scheduled delivery date and time. The case where the delivery destination is registered in the delivery system 1 is a case where the user 3 desires to receive the package in a non-face-to-face manner, that is, a case where the user information includes a package drop service request command. The delivery management unit 511 acquires the identification information (IP address) of the deliverer terminal 40 possessed by the deliverer 4 from the deliverer information stored in the storage unit 52 in association with the identification ID of the deliverer 4. Based on the acquired identification information of the deliverer terminal 40, the delivery management unit 511 establishes communication with the deliverer terminal 40 via the communication unit 53 and transmits the delivery information to the deliverer terminal 40 via the communication unit 53. The deliverer 4 delivers the package based on this delivery information. Based on the user information stored in the storage unit 52 in association with the user ID of the user 3, who is the destination of the delivery request, the delivery management unit 511 establishes communication with the user terminal 30 of the user 3, and transmits the delivery information to the user terminal 30 via the communication unit 53. This enables the user 3 to know the package delivery schedule.

When the destination of the delivery request received by the delivery management unit 511 is the user 3, the acquisition unit 512 acquires the identification information (IP address) of the in-vehicle terminal 20 mounted on the vehicle 100 of the user 3 from the vehicle information stored in the storage unit 52 in association with the user ID of the user 3. The acquisition unit 512 establishes communication with the in-vehicle terminal 20 via the communication unit 53 based on the acquired identification information of the in-vehicle terminal 20. The acquisition unit 512 acquires the detection value of the object detection sensor 248 from the in-vehicle terminal 20. Specifically, the acquisition unit 512 transmits a transmission command of the detection value of the object detection sensor 248 to the in-vehicle terminal 20, and receives the detection value transmitted from the in-vehicle terminal 20 in response to the transmission command. The acquisition unit 512 acquires the vehicle information stored in the storage unit 52 in association with the user ID of the user 3. Furthermore, the acquisition unit 512 acquires the delivery information stored in the storage unit 52.

Based on the detection value of the object detection sensor 248 acquired by the acquisition unit 512, the determination unit 513 determines whether or not an object (package) exists in the case portion 12, that is, whether or not the stowage apparatus 10 is in use.

The determination unit 513 determines whether or not case portion 12 can stow the package based on the determination result as to whether or not the stowage apparatus 10 is in use and the vehicle information (stowage apparatus information) acquired by the acquisition unit 512 and the delivery information (package information). Specifically, when obtaining the determination result that the stowage apparatus 10 is in use, the determination unit 513 determines that the case portion 12 cannot stow the package. On the other hand, when obtaining the determination result that the stowage apparatus 10 is not in use, based on the stowage apparatus information and the package information, the determination unit 513 determines whether or not the delivery target package is small enough to be stowed in the case portion 12, that is, whether or not the package satisfies a predetermined condition. For example, when any size of the length, the width, and the height of the package is larger than any size of the length, the width, and the height of the case portion 12, the determination unit 513 determines that the package is not small enough to be stowed. When the package does not satisfy the predetermined condition, the determination unit 513 determines that the case portion 12 cannot stow the package. On the other hand, when the package satisfies the predetermined condition, the determination unit 513 determines that the case portion 12 can stow the package.

Upon determining that the case portion 12 cannot stow the package, the determination unit 513 determines whether or not the package is small enough to be stowed in the trunk room of the vehicle 100 based on the vehicle information (trunk room information) acquired by the acquisition unit 512 and the delivery information (package information). When the package is small enough to be stowed in the trunk room of the vehicle 100, the determination unit 513 determines that the trunk room of the vehicle 100 can stow the package. On the other hand, when the package is not small enough to be stowed in the trunk room of the vehicle 100, it is determined that both the case portion 12 and the trunk room of the vehicle 100 cannot stow the package.

When the determination unit 513 determines that the case portion 12 can stow the package, the output unit 514 outputs an unlocking signal of the stowage apparatus 10 including a one-time password. This unlocking signal is transmitted to the deliverer terminal 40 via the communication unit 53. This enables the function of the deliverer terminal 40 as an electronic key, and enables unlocking of the opening-closing lock portion 14. At this time, the output unit 514 transmits, to the deliverer terminal 40, information indicating transmission of the unlocking signal of the stowage apparatus 10, that is, information indicating that the package drop service is possible (package drop service enabled information). This enables the deliverer 4 to recognize that the package can be delivered to the stowage apparatus 10. In addition to this, the output unit 514 may transmit, to the user terminal 30 via the communication unit 53, information indicating that the unlocking signal has been transmitted to the deliverer terminal 40. This enables the user 3 to recognize that the package is scheduled to be delivered to the stowage apparatus 10.

When the determination unit 513 determines that the package can be stowed in the trunk room of the vehicle 100, the output unit 514 requests the user 3 to unlock the trunk room of the vehicle 100. Specifically, the unlocking request of the trunk room is transmitted to the user terminal 30 via the communication unit 53. Upon receiving the unlocking request of the trunk room from the server apparatus 50, the user terminal 30 displays, on a display (not illustrated), a screen for notifying that the unlocking request of the trunk room has been made and a screen for responding to the unlocking request. By operating the user terminal 30, the user 3 responds to the unlocking request of the trunk room. Upon receiving a response indicating approval for unlocking the trunk room from the user terminal 30, the output unit 514 transmits an unlocking command of the trunk room to the in-vehicle terminal 20. At this time, the output unit 514 also transmits, to the deliverer terminal 40, the package drop service enabled information indicating that the package drop service is possible in the trunk room. Upon receiving the unlocking command of the trunk room, the in-vehicle terminal 20 (the lock control unit 212) transmits an unlocking signal to the trunk lock actuator 244 to bring the trunk room of the vehicle 100 into the unlocked state.

On the other hand, upon receiving a response indicating rejection for unlocking the trunk room from the user terminal 30, the output unit 514 transmits, to the deliverer terminal 40, information indicating that the package drop service is impossible (package drop service disabled information). This enables the deliverer to recognize that the package can be delivered to neither the stowage apparatus 10 nor the trunk room of the vehicle 100. At this time, the output unit 514 may simultaneously transmit the package drop service disabled information to the user terminal 30. When a package is already stowed and the stowage apparatus 10 is in use, a notification instructing taking out of the package may be included in the package drop service disabled information. When the user 3 takes out the package from the stowage apparatus 10 after this notification and the object detection sensor 248 no longer detects an object in the stowage apparatus 10, the output unit 514 may transmit the package drop service enabled information to the deliverer terminal 40.

Note that the acquisition unit 512 may acquire the detection value of the object detection sensor 248 from the in-vehicle terminal 20 and acquire position information of the vehicle 100 (e.g., information from a GPS sensor mounted on the vehicle 100). In this case, when the stowage apparatus 10 is not in use, the package satisfies the predetermined condition, and the position of the vehicle 100 is within the delivery area of the deliverer 4, the determination unit 513 determines that the case portion 12 can stow the package. On the other hand, when the position of the vehicle 100 is outside the delivery area of the deliverer 4, even when the stowage apparatus 10 is not in use and the package satisfies the predetermined condition, it is determined that the case portion 12 cannot stow the package.

Figure 9:
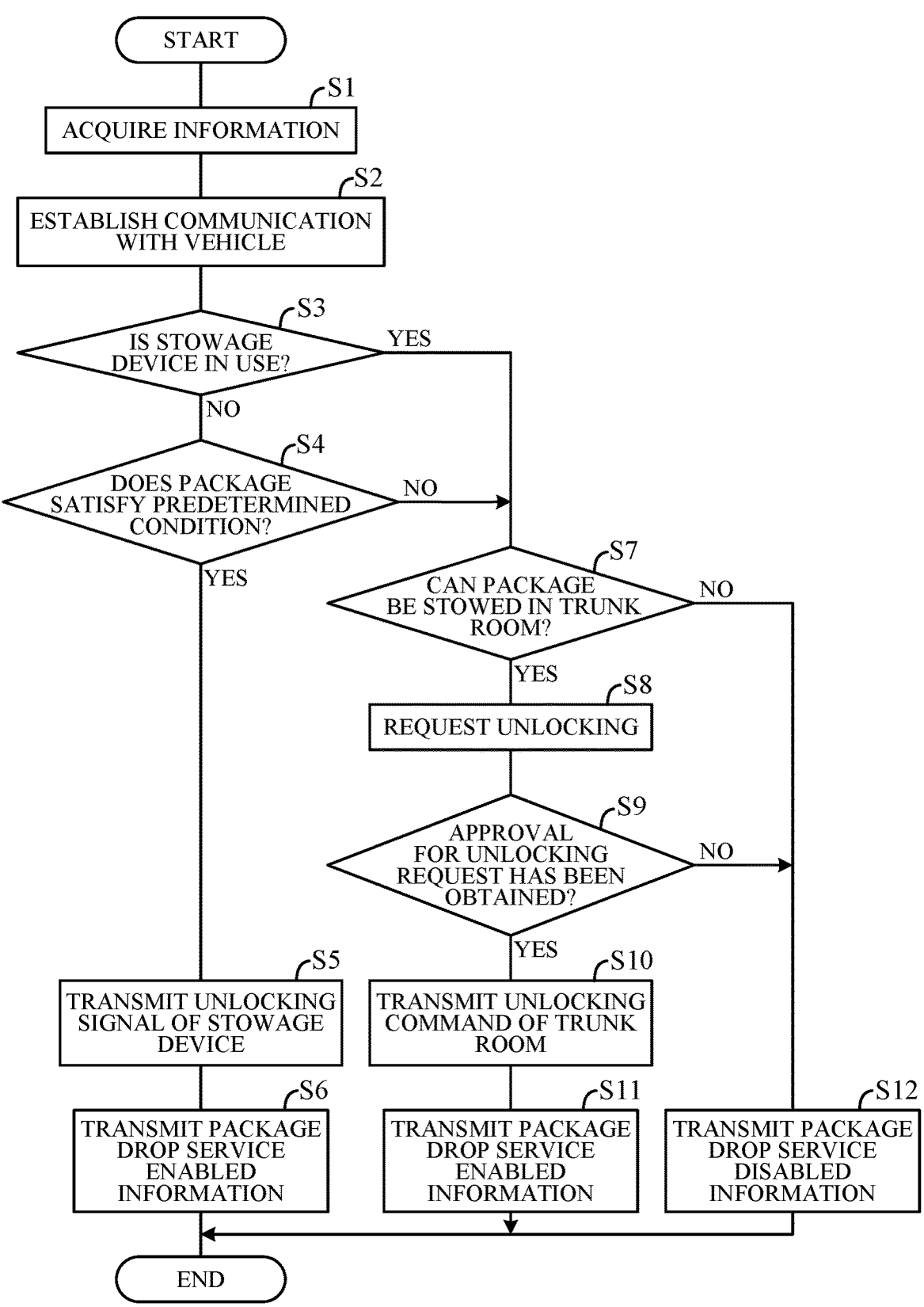
FIG. 9 is a flowchart illustrating an example of processing executed by the CPU of the server apparatus of FIG. 6.

FIG. 9 is a flowchart illustrating an example of processing executed by the CPU of the server apparatus 50 according to a program stored in advance in a memory. When the delivery office to which the deliverer 4 belongs receives a delivery request addressed to the user 3 registered in advance in the delivery system 1, delivery information regarding this delivery request is transmitted to the server apparatus 50 via the communication terminal (not illustrated) of the delivery office. The processing illustrated in the flowchart of FIG. 9 is started, for example, when the server apparatus 50 stores, into the storage unit 52, the delivery information received via the communication unit 53.

First, in step S1, vehicle information corresponding to the user ID stored in advance in the storage unit 52 is acquired, and delivery information stored in advance in the storage unit 52 is acquired. In step S2, communication with the vehicle 100 of the user 3 is established. More specifically, identification information of the in-vehicle terminal 20 mounted on the vehicle 100 of the user 3 is acquired from the vehicle information acquired in step S1, and communication with the in-vehicle terminal 20 via the communication unit 53 is established based on the identification information. In step S3, a detection value of the object detection sensor 248 is acquired from the in-vehicle terminal 20 via the communication unit 53, and, based on the detection value, it is determined whether or not the stowage apparatus 10 is in use, specifically, whether or not an object (package) exists in the case portion 12.

If the determination in step S3 is negative, based on the vehicle information (stowage apparatus information) and the delivery information (package information) acquired in step S1, it is determined in step S4 whether or not the package scheduled to be delivered satisfies the predetermined condition, that is, whether or not the package is small enough to be stowed in the case portion 12 of the stowage apparatus 10. If the determination in step S4 is affirmative, the process proceeds to step S5, and the unlocking signal of the stowage apparatus 10 is transmitted to the deliverer terminal 40 via the communication unit 53. Note that based on the information of the scheduled delivery date and time included in the delivery information acquired in step S1, the unlocking signal may be transmitted when the scheduled delivery time of the package comes. Alternatively, the position of the deliverer terminal 40 may be detected by a GPS sensor built in the deliverer terminal 40, and the unlocking signal may be transmitted when the position of the deliverer terminal 40 falls within a predetermined range from the vehicle 100. Next, in step S6, the package drop service enabled information indicating that the package drop service is possible in the stowage apparatus 10 is transmitted to the user terminal 30 and the deliverer terminal 40, and the processing ends.

On the other hand, if the determination in step S3 is affirmative or determination in step S4 is negative, the process proceeds to step S7. In step S7, it is determined whether or not the package scheduled to be delivered can be stowed in the trunk room of the vehicle 100. At this time, based on the vehicle information (trunk room information) and the delivery information (package information) acquired in step S1, it is determined whether or not the package is small enough to be stowed in the trunk room, and when the package is small enough to be stowed in the trunk room, it is determined that the package can be stowed in the trunk room.

If the determination in step S7 is affirmative, unlocking of the trunk room is requested to the user 3 in step S8. Specifically, the unlocking request of the trunk room is transmitted to the user terminal 30. In step S9, it is determined whether or not approval for the unlocking request of the trunk room has been obtained from the user 3. Specifically, it is determined whether or not a response indicating approval for the unlocking of the trunk room has been received from the user terminal 30. If the determination in step S9 is affirmative, the process proceeds to step S10, and an unlocking command of the trunk room is transmitted to the in-vehicle terminal 20 via the communication unit 53. Similarly to the unlocking signal of the stowage apparatus 10, the unlocking command of the trunk room may be transmitted when the scheduled delivery time of the package comes or when the position of the deliverer terminal 40 falls within the predetermined range from the vehicle 100. In step S11, the package drop service enabled information indicating that the package drop service is possible in the trunk room of the vehicle 100 is transmitted to the user terminal 30 and the deliverer terminal 40, and the processing ends.

On the other hand, if the determination in step S7 or step S9 is negative, the package drop service disabled information indicating that the package drop service is impossible in the stowage apparatus 10 and the trunk room of the vehicle 100 is transmitted to the user terminal 30 and the deliverer terminal 40 in step S12, and the processing ends.

The operation of the present embodiment is summarized as follows. Note that it is assumed that the user 3 went to his/her company (workplace) with the vehicle 100, and the vehicle 100 is parked in a parking lot of the workplace of the user 3. In such a situation, when a package delivery request is made to the delivery office with the user 3 as a destination, delivery information is transmitted from the delivery office, more specifically, from the communication terminal (not illustrated) of the delivery office to the server apparatus 50 (step S1). When the stowage apparatus 10 is not in use and the package is small enough to be stowed in the stowage apparatus 10, the server apparatus 50 determines that the stowage apparatus 10 can stow the package, transmits the unlocking signal to the deliverer terminal 40 (steps S3, S4, and S5), and transmits the package drop service enabled information to the user terminal 30 and the deliverer terminal 40 (step S6).

When the deliverer terminal 40 receives the unlocking signal and the package drop service enabled information, the deliverer 4 unlocks the opening-closing lock portion 14 of the stowage apparatus 10 using the deliverer terminal 40. The unlocking signal in this case includes a one-time password, and the deliverer terminal 40 can unlock the opening-closing lock portion 14 only once. The deliverer 4 pulls out the case portion 12 from the case support portion 11, stows the package into the case portion 12, and then returns the case portion 12 to the storage position.

Based on the detection value of the object detection sensor 248 and the detection value of the lock detection sensor 245, the in-vehicle terminal 20 determines whether or not the stowage apparatus 10 stows the package and the stowage apparatus 10 has been locked, that is, determines whether or not the package has been delivered to the stowage apparatus 10, and, upon determining that the package has been delivered, transmits delivery completion information to the server apparatus 50. The server apparatus 50 transmits the delivery completion information to the user terminal 30. Note that the delivery completion information may be transmitted to the user terminal 30 not from the server apparatus 50 but from the in-vehicle terminal 20.

Thereafter, the user 3 goes to the vehicle 100 where the package is delivered to the stowage apparatus 10, operates the user terminal 30 to unlock the opening-closing lock portion 14 of the stowage apparatus 10, pulls out the case portion 12, and takes out the package from the case portion 12.

Note that when the package is too large in size to be stowed in the stowage apparatus 10 or the trunk room of the vehicle 100, the package drop service disabled information is transmitted to the user terminal 30 and the deliverer terminal 40 (steps S3, S4, S7, and S12). Similarly, when the stowage apparatus 10 is in use, the package drop service disabled information is transmitted to the user terminal 30 and the deliverer terminal 40 (steps S3, S7, and S12). In this case, the deliverer 4 may visit the residence of the user 3 and deliver the package face-to-face to the user 3. Note that in a case where neither the stowage apparatus 10 nor the trunk room of the vehicle 100 can stow the package and the deliverer 4 brings the package back, a notification indicating the fact may be transmitted to the user terminal 30.

According to the present embodiment, the following functions and effects can be achieved.

(1) The stowage apparatus 10 is provided in the vehicle 100. The stowage apparatus 10 includes the case portion 12 forming the package room separated from the vehicle interior space, the case support portion 11 movably supporting the case portion 12 between the storage position where the case portion 12 is stored in the vehicle 100 and the pull-out position where the case portion 12 is pulled out from the vehicle 100, and the air conditioning portion 13 forming an air flow in the case portion 12. The air conditioning portion 13 includes the air inlet 111L and the air outlet 111R. When the case portion 12 is positioned in the storage position. The air inlet 111L guides air in a substantially horizontal direction into the package room and the air outlet 111R discharges air in a substantially horizontal direction from the package room, and the air inlet 111L is provided below the air outlet 111R. This makes it possible to maintain the internal temperature of the stowage apparatus 10 at a temperature suitable for storage of the package, and makes it easier to use the stowage apparatus 10 as a storage place of the package. As a result, the stowage apparatus 10 can be used as a designated place for the package drop service or can be used as a temporary storage place for purchased goods when the user goes shopping with the vehicle 100, and the convenience of the stowage apparatus 10 is improved. Since the package room of the stowage apparatus 10 is separated from the vehicle interior space, it is possible to prevent a third party from accessing the vehicle interior space through the package room.

(2) The vehicle 100 includes the heating portion HT whose temperature rises to equal to or greater than the predetermined threshold when use of the vehicle 100 is started. The air inlet 111L is provided farther from the heating portion HT than the air outlet 111R when the case portion 12 is positioned in the storage position. This makes it possible to avoid the air warmed by the heating portion HT from flowing in from the air inlet 111L, and prevent the internal temperature of the stowage apparatus 10 from rising.

(3) The case portion 12 has the side wall (first side wall) 123L and the side wall (second side wall) 123R extending in the pull-out direction and opposing each other. The air inlet 111L is provided in the case support portion 11 so as to oppose the side wall 123L when the case portion 12 is positioned in the storage position. The air outlet 111R is provided in the case support portion 11 so as to oppose the side wall 123R when the case portion 12 is positioned in the storage position. The case portion 12 has the air hole (first air hole) 121L provided on the side wall 123L so as to oppose the air inlet 111L provided in the case support portion 11, and the air hole (second air hole) 121R provided on the side wall 123R so as to oppose the air outlet 111R provided in the case support portion 11. This makes it easy to form a flow of air flowing into the case portion 12 and flowing out from the case portion 12 even when the case portion 12 is positioned in the storage position.

(4) The case support portion 11 has the outer case portion (FIG. 2) formed in a case shape so as to surround the case portion 12 when the case portion 12 is positioned in the storage position, and the outer case portion is formed of a heat insulating material. This makes it possible to suppress the temperature in the case portion 12 from excessively rising or falling.

(5) The case support portion 11 is provided below the horizontal plane extending along the floor of the vehicle interior space. This makes it possible to avoid the stowage apparatus 10 from being irradiated with direct sunlight, and suppress the temperature in the case portion 12 from excessively rising.

According to the present embodiment, the following functions and effects can be further achieved.

(1) The delivery system 1 mainly includes: the in-vehicle terminal 20 of the vehicle 100 and the server apparatus 50, and includes: the lock detection sensor (lock detector) 245 that detects unlocking and locking of a second package room (the stowage apparatus 10) that is provided below a horizontal plane, is separated from both the vehicle interior space and a first package room (the trunk room TR of the vehicle 100) formed above the horizontal plane extending along the floor of the vehicle interior space, and allows the package to be taken in and out from the outside of the vehicle 100; the air conditioning portion 13 forming the flow of air in the stowage apparatus 10 (the case portion 12); and the air conditioning control unit 211 that controls the air conditioning portion 13. The air conditioning control unit 211 operates the air conditioning portion 13 when the lock detection sensor 245 detects locking of the stowage apparatus 10 in a state where the stowage apparatus 10 stows a package. More specifically, the operation signal is output to the air conditioning portion 13 so that the fan 241 operates. This makes it possible to use the stowage apparatus 10 of the vehicle 100 as a temporary storage place of the package such as a delivery destination of the package while preventing a third party other than the user 3 from accessing the vehicle interior space. Since a package can be taken in and out of the stowage apparatus 10 from the outside of the vehicle 100, a package can be easily taken in and out of the stowage apparatus 10.

(2) The delivery system 1 further includes: the communication units 23 and 53 that communicate with an external device (the user terminal 30 and the deliverer terminal and the lock control unit 212 that outputs an unlocking signal to a second package room lock actuator (the pull-out lock actuator 243) so that the stowage apparatus 10 is brought into an unlocked state where the package can be taken in and out upon receiving an unlocking command of the stowage apparatus 10 from the user terminal 30 associated with the user of the vehicle 100 via the communication unit 23, and outputs a locking signal to the pull-out lock actuator 243 so that the stowage apparatus 10 is brought into a locked state where the package cannot be taken in and out upon receiving a locking command of the stowage apparatus 10 from the user terminal 30 via the communication unit 23.

(3) When the locked state of the stowage apparatus 10 is not detected by the lock detection sensor 245 for a certain period of time or more after the package is stowed in the stowage apparatus 10, the lock control unit 212 notifies the user terminal 30 of forgetting to lock via the communication unit 23. More specifically, display information or voice information indicating forgetting to lock is transmitted to the user terminal 30. This makes it possible to prevent the package in the case portion 12 from being taken out by a third party even when the deliverer 4 or the user 3 forgets to lock the stowage apparatus 10.

(4) The delivery system 1 further includes: the determination unit 513 that determines, when package information including the shape and size of a package is received via the communication unit 53 from the deliverer terminal 40 associated with the deliverer 4 who delivers the package to the stowage apparatus 10, whether or not the package can be stowed in the stowage apparatus 10 based on the shape and size of the package indicated by the package information and the shape and capacity of the stowage apparatus 10; and the output unit 514 that transmits, to the user terminal 30, an unlocking request for the trunk room of the vehicle 100 when the determination unit 513 determines that the package cannot be stowed in the stowage apparatus 10. Upon receiving the unlocking command of the trunk room transmitted from the user terminal 30 in response to the unlocking request, the lock control unit 212 outputs an unlocking signal to a first package room lock actuator (the trunk lock actuator 244) so that the trunk room of the vehicle 100 is brought into the unlocked state where the package can be taken in and out. This makes it possible to deliver the package to the trunk room of the vehicle 100 even when the package is too large in size to fit in the stowage apparatus 10, and to reduce time and effort of the deliverer such as redelivery. Since the user no longer needs to request for redelivery, convenience of the user can be improved.

(5) The in-vehicle terminal 20 further includes the temperature sensor 246 that detects the temperature in the stowage apparatus 10. The air conditioning control unit 211 operates the air conditioning portion 13 when the detection value of the temperature sensor 246 is equal to or greater than a predetermined temperature, and stops the operation of the air conditioning portion 13 when the detection value of the temperature sensor 246 is less than the predetermined temperature. This makes it possible to avoid the temperature in the case portion 12 from excessively rising.

(6) When the detection value of the temperature sensor 246 is equal to or greater than the predetermined temperature even after the predetermined time elapses after the air conditioning portion 13 is operated, the air conditioning control unit 211 notifies the user terminal 30 of the temperature abnormality of the stowage apparatus via the communication unit 23. This makes it possible to prevent a package from being stowed for a long time in the case portion 12 where the temperature has excessively risen.

(7) The in-vehicle terminal 20 further includes the failure detection sensor 247 that detects a failure of the air conditioning portion 13. When the failure detection sensor 247 detects the failure of the air conditioning portion 13, the air conditioning control unit 211 notifies the user terminal 30 of the failure of the air conditioning portion 13 via the communication unit. This makes it possible to suppress the temperature in the case portion 12 from excessively rising due to a failure of the air conditioning portion 13.

(8) The stowage apparatus 10 is formed of a heat insulating material. This makes it possible to further suppress the temperature in the case portion 12 from excessively rising or falling.

(9) The delivery system 1 mainly includes: the in-vehicle terminal 20 of the vehicle 100 and the server apparatus 50, and includes: the lock detection sensor 245 that detects unlocking and locking of a second package room (the stowage apparatus 10) that is provided below a horizontal plane, is separated from both the vehicle interior space and a first package room (the trunk room of the vehicle 100) formed above the horizontal plane extending along the floor of the vehicle interior space, and allows the package to be taken in and out from the outside of the vehicle 100; the air conditioning portion 13 forming the flow of air in the stowage apparatus 10 (the case portion 12); the air conditioning control unit 211 that controls the air conditioning portion 13; and the object detection sensor 248 that detects presence or absence of an object in the stowage apparatus 10. The air conditioning control unit 211 stops the operation of the air conditioning portion 13 when the object detection sensor 248 has not detected an object in the stowage apparatus 10, and operates the air conditioning portion 13 when the object detection sensor 248 detects an object in the stowage apparatus 10. Furthermore, the in-vehicle terminal 20 includes the temperature sensor 246 that detects the temperature of the stowage apparatus 10, and the air conditioning control unit 211 operates the air conditioning portion 13 when the detection value of the temperature sensor 246 is equal to or greater than a predetermined temperature, and stops the operation of the air conditioning portion 13 when the detection value of the temperature sensor 246 is less than the predetermined temperature. More specifically, the air conditioning control unit 211 outputs an operation signal to the air conditioning portion 13 so that the fan 241 operates when the detection value of the temperature sensor 246 is equal to or greater than the predetermined temperature, and outputs a stop signal to the air conditioning portion 13 so that the operation of the fan 241 is stopped when the detection value of the temperature sensor 246 is less than the predetermined temperature. This makes it possible to maintain the temperature in the case portion 12 at a desired temperature or less without operating the air conditioning portion 13 more than necessary. Since the power consumption of the air conditioning portion 13 can be reduced, it is possible to prevent the remaining battery amount from being reduced more than necessary when the air conditioning portion 13 is operated by the power from an in-vehicle battery, such as when the engine of the vehicle is stopped.

(10) When the detection value of the temperature sensor 246 is equal to or greater than a predetermined temperature even after a predetermined time elapses after the fan 241 of the air conditioning portion 13 is operated, the air conditioning control unit 211 notifies the user terminal 30 of a temperature abnormality of the stowage apparatus 10 via the communication unit 23. More specifically, the air conditioning control unit 211 transmits display information or voice information indicating the temperature abnormality of the stowage apparatus 10 to the user terminal 30 via the communication unit 23. This makes it possible to prevent a package from being stowed for a long time in the case portion 12 where the temperature has excessively risen.

The above embodiment can be changed to various forms. Some variation will be described below. In the above embodiment, the determination unit 513 determines whether or not the stowage apparatus 10 is in use, and, based on the determination result, the delivery information, and the stowage apparatus information, determines whether or not the case portion 12 can stow the package. However, the in-vehicle terminal 20 may perform the above determination as to whether or not the case portion 12 can stow a package. That is, the in-vehicle terminal 20 may include the determination unit. In this case, the determination unit of the in-vehicle terminal 20 determines whether or not the stowage apparatus 10 is in use based on the detection value of the object detection sensor 248. The determination unit acquires, from the server apparatus 50, vehicle information (stowage apparatus information) and delivery information (package information) corresponding to the user 3. More specifically, a transmission request command of the vehicle information (stowage apparatus information) and the delivery information (package information) corresponding to the user 3 is transmitted to the server apparatus 50 via the communication unit 23. Upon receiving those pieces of information transmitted from the server apparatus 50, the determination unit stores those pieces of information into the storage unit 22. Furthermore, the determination unit determines whether or not the case portion 12 can stow the package based on the determination result as to whether or not the stowage apparatus 10 is in use, and the acquired stowage apparatus information and package information. Note that the vehicle information (stowage apparatus information) may also be stored in advance in the storage unit 22 of the in-vehicle terminal 20.

In the above embodiment, when the determination unit 513 determines that the case portion 12 cannot stow the package, the output unit 514 as a request unit requests the user 3 to unlock the trunk room of the vehicle 100. However, when determining that the case portion 12 cannot stow the package, the determination unit 513 may transmit, to the user terminal 30, the unlocking request of the trunk room of the vehicle 100. That is, the determination unit 513 may function as a request unit.

In the above embodiment, an example where the case portion 12 has the end wall 122 forming the vehicle body surface when the case portion 12 is positioned in the storage position, and the vehicle body surface on the side of the end wall 122 is provided with the switch SW, which is a part of the input-output unit 242 of the in-vehicle terminal 20, has been described. However, the switch that inputs the pull-out command of the case portion 12 may be included in a part of the stowage apparatus 10.

In the above embodiment, the configuration in which the arithmetic unit 21 of the in-vehicle terminal 20 includes, as a functional configuration, the lock control unit 212 as the lock control unit has been described as an example. However, when the stowage apparatus 10 includes a computer having an arithmetic unit such as a CPU, a storage unit such as a ROM and a RAM, and other peripheral circuits such as an I/O interface, the arithmetic unit of the stowage apparatus 10 may include a lock control unit as a functional configuration. That is, the lock control unit of the stowage apparatus 10 may bring the opening-closing lock portion 14 into the non-actuated state in response to the operation of the switch SW when the vehicle is stopped, and bring the opening-closing lock portion 14 into the actuated state regardless of the operation of the switch SW when the vehicle is in traveling. In the above embodiment, the configuration in which the arithmetic unit 21 of the in-vehicle terminal 20 includes the air conditioning control unit 211 as a functional configuration has been described as an example, but the arithmetic unit of the stowage apparatus 10 may include the air conditioning control unit as a functional configuration.

In the above embodiment, the lock control unit 212 as a lock control unit transmits, to the user terminal 30, information for notifying of unlocking or locking of the stowage apparatus 10. However, the lock control unit may transmit, to the user terminal image information (hereinafter, referred to as captured image) obtained by imaging the inside of the stowage apparatus 10 together with information for notifying of unlocking or locking of the stowage apparatus 10. In this case, a camera (not illustrated) is installed at a predetermined location in the stowage apparatus 10, for example, on the lower surface of the upper wall 112U of the case support portion 11 such that the inside of the stowage apparatus 10 is entirely included in the imaging range. Then, the lock control unit controls the camera to image the inside of the stowage apparatus 10. The lock control unit may transmit, to the user terminal 30, the captured image in the stowage apparatus 10 not only at the time of unlocking or locking the stowage apparatus 10 but also at predetermined time intervals while the in-vehicle terminal 20 is powered on.

In the above embodiment, when the user 3 operates the user terminal 30 to respond to the unlocking request of the trunk room, and the output unit 514 receives a response indicating approval of the unlocking from the user terminal 30, the unlocking command of the trunk room is transmitted to the in-vehicle terminal 20. However, the user terminal 30 that has received the unlocking request of the trunk room from the server apparatus 50 may transmit the unlocking command of the trunk room to the in-vehicle terminal 20 in response to the input operation of the user 3.

In the above embodiment, when the package scheduled to be delivered is small enough to be stowed in the trunk room, the determination unit 513 determines that the package scheduled to be delivered can be stowed in the trunk room. However, when the vehicle interior space is accessible from the trunk room of the vehicle 100, the determination unit may determine that the package scheduled to be delivered cannot be stowed in the trunk room even if the package scheduled to be delivered is small enough to be stowed in the trunk room. In this case, the trunk room information stores information indicating whether or not the trunk room of the vehicle 100 is a trunk room accessible to the vehicle interior space. The trunk room inaccessible to the vehicle interior space is, for example, a sealed trunk room. On the other hand, the trunk room accessible to the vehicle interior space is, for example, an open type trunk room such as the trunk room TR in FIGS. 4A and 4B. This makes it possible to prevent a third party other than the user 3, who is the owner of the vehicle 100, from accessing the vehicle interior space from the trunk room.

In the above embodiment, the output unit 514 requests the user 3 to unlock the trunk room of the vehicle 100 when the determination unit 513 determines that the case portion 12 cannot stow the package. However, by operating the deliverer terminal 40, the deliverer 4 may request the server apparatus 50 to unlock the trunk room of the vehicle 100. The server apparatus 50 (the output unit 514) that has received this request transmits an unlocking request of the trunk room to the user terminal 30 via the communication unit 53. This enables the deliverer 4 himself/herself to request the user 3 to unlock the trunk room, for example, in a case where it is difficult or impossible for the deliverer 4 to stow the package into the case portion 12. Therefore, it is possible to further reduce time and effort of the deliverer such as redelivery.

In the above embodiment, an example where the air conditioning control unit 211 operates and stops the fan 241 has been described, but the fan 241 may be operable and stoppable by the user operation. For example, a switch for operating and stopping the fan 241 may be provided in the vehicle 100 (e.g., vehicle body surface or vehicle interior), and the fan 241 may be operated and stopped in response to the operation of the switch. An operation command and a stop command of the fan 241 may be transmitted from the user terminal 30 to the in-vehicle terminal 20 in response to the input operation of the user 3. In this case, upon receiving the operation command or the stop command from the user terminal 30 via the communication unit 23, the air conditioning control unit operates or stops the fan 241. Upon operating the fan 241 in response to the operation command from the user terminal 30, the air conditioning control unit notifies the user 3 that the fan 241 is operating normally together with the internal temperature of the case portion 12 while the fan 241 is in operation. When stopping the fan 241 in response to the stop command from the user terminal 30, the air conditioning control unit notifies the user 3 that the fan 241 has stopped together with the internal temperature of the case portion 12.

In the above embodiment, when the locking of the stowage apparatus 10 is detected in a state where the case portion 12 of the stowage apparatus 10 stows a package, the air conditioning control unit 211 operates the fan 241. However, the output unit of the server apparatus 50 may transmit a command for operating the fan 241 to the in-vehicle terminal 20 at a time a predetermined period of time before the scheduled delivery date and time of the package. In this case, the air conditioning control unit of the in-vehicle terminal 20 operates the fan 241 upon receiving this command.

In the above embodiment, an example where the stowage apparatus 10 provided in the vehicle 100 is applied to the stowage system (delivery system) 1 that can designate the stowage apparatus 10 as a package delivery place has been described, but the stowage apparatus 10 may be used for other purposes such as a rental locker in addition to the package delivery place. For example, the stowage apparatus 10 may be lent out to a user other than the user 3 via a business office that conducts a rental locker business.

In the above embodiment, the air conditioning control unit 211 operates or stops the fan 241 based on whether or not the detection value of the temperature sensor 246 is equal to or greater than the predetermined temperature. However, the air conditioning control unit may operate or stop the fan 241 based on whether or not the detection value of the temperature sensor 246 is equal to or greater than a temperature threshold value set in advance by the user 3. In this case, by operating the user terminal 30, the user 3 transmits the temperature threshold to the in-vehicle terminal 20 in advance. The in-vehicle terminal 20 stores the received temperature threshold into the storage unit 22.

Furthermore, in the above embodiment, the stowage apparatus 10 in which the case support portion 11 supports the case portion 12 to be able to be pulled out in the substantially horizontal direction via the slide rail 15 has been described as an example. However, the stowage apparatus may have a pull-out mechanism other than the slide rail. In the above embodiment, the stowage apparatus 10 provided at the rear of the vehicle 100 and having the case portion 12 that can be pulled out rearward from the vehicle rear end has been described as an example. However, for the stowage apparatus, the installation location of the vehicle 100 is not limited to the rear of the vehicle 100. For example, a case portion provided at the front of the vehicle 100 and can be pulled out forward from a vehicle front end may be included.

The above embodiment can be combined as desired with one or more of the above modifications. The modifications can also be combined with one another.

According to the present invention, the convenience of the trunk separated from the vehicle interior space can be improved.

Above, while the present invention has been described with reference to the preferred embodiments thereof, it will be understood, by those skilled in the art, that various changes and modifications may be made thereto without departing from the scope of the appended claims.

What is claimed is:

1. A stowage system comprising:
   a stowage apparatus of a vehicle comprising a second package room separated from both an interior space and a first package room of the vehicle, wherein the second package room is provided below a horizontal plane extending along a floor of the interior space and the first package room provided above the horizontal plane, and the second package room allows a package to be taken in and out from an outside of the vehicle;
   a lock detection sensor detecting an unlocked state of the stowage apparatus where the package can be taken in and out of the second package room, or a locked state of the stowage apparatus where the package cannot be taken in and out of the second package room;
   an air conditioning portion forming a flow of air in the second package room; and
   a microprocessor and a memory coupled to the microprocessor, wherein
   the air conditioning portion has a fan and forms the flow of air in the second package room by the fan, and
   the microprocessor is configured to perform
   outputting an operation signal to the air conditioning portion so that the fan operates when the lock detection sensor detects locking of the second package room and when the second package room stows the package.

2. The stowage system according to claim 1 further comprising:

a communication unit communicating with an external apparatus; and a lock actuator locking and unlocking the second package room, wherein the microprocessor is configured to further perform outputting an unlocking signal to the lock actuator so that the second package room is in the unlocked state when receiving an unlocking command of the second package room from a user terminal associated with a user of the vehicle via the communication unit, and outputting a locking signal to the lock actuator so that the second package room is in the locked state when receiving a locking command of the second package room from the user terminal via the communication unit.

3. The stowage system according to claim 2, wherein the microprocessor is configured to further perform transmitting, when the locked state of the second package room is not detected by the lock detection sensor for a certain period of time or more after the package is stowed in the second package room, display information or voice information indicating forgetting to lock the second package room via the communication unit to the user terminal.

4. The stowage system according to claim 3, wherein the lock actuator is a second package room lock actuator, the stowage system further comprising a first package room lock actuator locking and unlocking the first package room, the first package room has a larger capacity than the second package room, the memory stores package room information indicating shape and capacity of the second package room, and the microprocessor is configured to further perform determining, when package information including shape and size of the package is received via the communication unit, whether or not the package can be stowed in the second package room based on the shape and size of the package indicated by the package information and the shape and capacity of the second package room indicated by the package room information, and transmitting, to the user terminal, an unlocking request for the first package room when it is determined that that the package cannot be stowed in the second package room, wherein the microprocessor is configured to perform the outputting the unlocking signal including outputting, when receiving an unlocking command of the first package room transmitted from the user terminal in response to the unlocking request, an unlocking signal to the first package room lock actuator so that the first package room is in an unlocked state where the package can be taken in and out.

5. The stowage system according to claim 2 further comprising a temperature sensor detecting a temperature in the second package room, the microprocessor is configured to perform the outputting the operation signal including outputting the operation signal to the air conditioning portion so that the fan operates when a detection value of the temperature sensor is equal to or greater than a predetermined temperature, and outputting a stop signal to the air conditioning portion so that operation of the fan stops when the detection value of the temperature sensor is less than the predetermined temperature.

6. The stowage system according to claim 5, wherein the microprocessor is configured to further perform transmitting, when the detection value of the temperature sensor is equal to or greater than the predetermined temperature even after a predetermined time elapses after the fan is operated, display information or voice information indicating temperature abnormality of the second package room via the communication unit to the user terminal.

7. The stowage system according to claim 2 further comprising a failure detection sensor detecting a failure of the air conditioning portion, wherein the microprocessor is configured to further perform transmitting, when the failure detection sensor detects the failure of the air conditioning portion, display information or voice information indicating the failure of the air conditioning portion via the communication unit to the user terminal.

8. The stowage system according to claim 1, wherein the second package room is formed of a heat insulating material.

9. A stowage system comprising:

a stowage apparatus of a vehicle comprising a second package room separated from both an interior space and a first package room of the vehicle, wherein the second package room is provided below a horizontal plane extending along a floor of the interior space and the first package room provided above the horizontal plane, and the second package room allows a package to be taken in and out from an outside of the vehicle;

a lock detection sensor detecting an unlocked state of the stowage apparatus where the package can be taken in and out of the second package room, or a locked state of the stowage apparatus where the package cannot be taken in and out of the second package room;

an air conditioning portion forming a flow of air in the second package room;

an object detection sensor detecting presence or absence of an object in the second package room; and a microprocessor and a memory coupled to the microprocessor, wherein the air conditioning portion has a fan and forms the flow of air in the second package room by the fan, and the microprocessor is configured to perform outputting a stop signal to the air conditioning portion so that operation of the fan stops when the object detection sensor does not detect the object in the second package room, and an operation signal to the air conditioning portion so that the fan operates when the object detection sensor detects the object in the second package room.

10. The stowage system according to claim 9 further comprising a temperature sensor detecting a temperature in the second package room, wherein the outputting includes outputting the operation signal to the air conditioning portion so that the fan operates when a detection value of the temperature sensor is equal to or greater than a predetermined temperature, and the stop signal to the air conditioning portion so that operation of the fan stops when the detection value of the temperature sensor is less than the predetermined temperature.

11. The stowage system according to claim 10 further comprising

25

26 a communication unit communicating with an external apparatus, wherein the microprocessor is configured to further perform transmitting, when the detection value of the temperature sensor is equal to or greater than the predetermined temperature even after a predetermined time elapses after the operation signal to the air conditioning portion is outputted, display information or voice information indicating temperature abnormality of the second package room via the communication unit to a user terminal associated with a user of the vehicle via the communication unit.

12. The stowage system according to claim 1, wherein the stowage apparatus comprises:

a case portion forming the second package room separated from the interior space; and a case support portion movably supporting the case portion between a storage position where the case portion is stored in the vehicle and a pull-out position where the case portion is pulled out from the vehicle, wherein the air conditioning portion forms an air flow in the case portion, wherein the air conditioning portion has an air inlet and an air outlet, when the case portion is positioned in the storage position, the air inlet guides air in a substantially horizontal direction into the second package room and the air outlet discharges air in a substantially horizontal direction from the second package room, and the air inlet is provided below the air outlet.

13. The stowage system according to claim 12, wherein the vehicle has a heating portion whose temperature rises to equal to or greater than a predetermined threshold when use of the vehicle is started, and the air inlet is provided farther from the heating portion than the air outlet when the case portion is positioned in the storage position.

14. The stowage system according to claim 13, wherein the case portion has an end wall forming a body surface of the vehicle when the case portion is positioned in the storage position, and the stowage system further comprising an input device provided on the body surface on a side of the end wall and inputting a pull-out command of the case portion.

15. The stowage system according to claim 14 further comprising a lock portion prohibiting movement of the case portion from the storage position to the pull-out position, and the microprocessor is configured to further perform controlling the lock portion so that the lock portion is switched between an actuated state and non-actuated state in response to an operation of the input device, wherein the controlling includes controlling the lock portion so that the lock portion is switched to the non-actuated state in response to the operation of the input device when the vehicle is stopped, and switched to the actuated state regardless of the operation of the input device when the vehicle is in traveling.

16. The stowage system according to claim 12, wherein the case portion has a first side wall and a second side wall extending in a pull-out direction and opposing each other, the air inlet is provided on the case support portion so as to oppose the first side wall when the case portion is positioned in the storage position, and the air outlet is provided on the case support portion so as to oppose the second side wall when the case portion is positioned in the storage position.

17. The stowage system according to claim 12, wherein the case support portion has an outer case portion formed in a case shape so as to surround the case portion when the case portion is positioned in the storage position.

18. The stowage system according to claim 16, wherein the case portion has a first air hole provided on the first side wall so as to oppose the air inlet provided in the case support portion, and a second air hole provided on the second side wall so as to oppose the air outlet provided in the case support portion.

19. The stowage system according to claim 12, wherein the case support portion is provided below the horizontal plane.

* * * * *